United States Patent
Patton (10) Patent No.: US 12,253,020 B2
(45) Date of Patent: Mar. 18, 2025

(54) ELECTRICAL POWER GENERATING SYSTEM

(71) Applicant: Mark Patton, Random Lake, WI (US)

(72) Inventor: Mark Patton, Random Lake, WI (US)

( * ) Notice: Subject to any disclaimer, the term of this patent is extended or adjusted under 35 U.S.C. 154(b) by 0 days.

(21) Appl. No.: 18/724,182

(22) PCT Filed: Dec. 29, 2022

(86) PCT No.: PCT/US2022/082591
§ 371 (c)(1),
(2) Date: Jun. 25, 2024

(87) PCT Pub. No.: WO2023/130048
PCT Pub. Date: Jul. 6, 2023

(65) Prior Publication Data
US 2025/0059910 A1    Feb. 20, 2025

Related U.S. Application Data (60) Provisional application No. 63/294,704, filed on Dec. 29, 2021.

(51) Int. Cl.
*F02C 1/02* (2006.01)
*F02C 6/16* (2006.01)

(52) U.S. Cl.
CPC .................. *F02C 1/02* (2013.01); *F02C 6/16* (2013.01); *F05D 2220/76* (2013.01)

(58) Field of Classification Search
CPC .......... F02C 1/02; F02C 6/16; F05D 2220/76; F05D 2220/31; F05D 2220/32;
(Continued)

(56) References Cited

U.S. PATENT DOCUMENTS 5,685,155 A * 11/1997 Brown ...................... F02C 1/00
                                                      60/659
8,572,972 B2 * 11/2013 Frey ........................ F01K 25/00
                                                      60/641.14
(Continued)

FOREIGN PATENT DOCUMENTS

CN       110778443       2/2020
JP       3104158 U       9/2004

OTHER PUBLICATIONS

International Search Report (Form PCT/ISA/210) for International Application No. PCT/US2022/082591 issued on Apr. 14, 2023.
(Continued)

*Primary Examiner* — Dapinder Singh (57) ABSTRACT

An electrical power generating system includes one or more air compressors, one or more air staging tanks, one or more turbines, and one or more electric generators. The air compressors are in fluid communication with the air staging tanks to supply compressed air to the one or more air staging tanks. The staging tanks are connected to and in fluid communication with the turbines to convey the compressed air to the one or more turbines, so as to rotate the turbines. Each of the turbines is connected to an electric generator to generate power from the compressed air flowing through the turbines. The turbines are arranged one above another to form a vertical air pathway through the one or more turbines.

17 Claims, 4 Drawing Sheets

(58) Field of Classification Search
CPC ............. F05D 2220/40; F05D 2220/30; F05D 2220/34; F03D 9/17; F03D 9/28; F03D 9/20; F03D 9/25; F03D 9/257; F03D 9/00; F03D 9/008; Y02E 60/16; Y02E 70/30; Y02E 10/20; Y02E 10/70; Y02E 10/72; Y02E 10/727; Y02E 10/728; Y02E 10/74; Y02E 10/76
See application file for complete search history.

(56) References Cited

U.S. PATENT DOCUMENTS

| | | | | |
|---|---|---|---|---|
| 8,863,519 B2* | 10/2014 | Kraft | ............... | F15B 1/022 |
| | | | | 60/408 |
| 8,978,380 B2* | 3/2015 | Kidd | ............... | F02C 7/143 |
| | | | | 60/659 |
| 2004/0148922 A1* | 8/2004 | Pinkerton | ............. | F02C 7/08 |
| | | | | 60/670 |
| 2009/0293469 A1 | 12/2009 | Chen | | |
| 2011/0041501 A1 | 2/2011 | Gerard | | |

OTHER PUBLICATIONS

Written Opinion of the International Searching Authority (Form PCT/ISA/237) for International Application No. PCT/US2022/082591 issued on Apr. 14, 2023.

\* cited by examiner

ELECTRICAL POWER GENERATING SYSTEM

CROSS-REFERENCE TO RELATED APPLICATIONS

This application claims priority to U.S. Provisional Application No. 63/294,704 filed on Dec. 29, 2021, which is hereby incorporated herein by reference.

FIELD OF THE INVENTION

The present invention relates generally to renewable energy systems. More specifically, the present invention is an air-powered electric generating system adapted for fixed and mobile electrical power generation applications.

BACKGROUND OF THE INVENTION

The global community is constantly searching for new and innovative ways to produce and store energy that is efficient while being environmentally friendly. Solar panels and windmills are amongst the main devices that are used to create renewable energy that is more environmentally friendly than past methods such as the burning of fossil fuels. Both of these renewable energy methods come with their own issues when it comes to setting up, maintaining and operating the machinery. The first issue with both windmills and solar panels is that both wind and solar rays are not constant and therefore can limit the electrical production during times of low wind or high cloud coverage. Further, both of these systems take up large amounts of space above the ground, disturbing various wildlife habitats, while also making various unattractive landscapes.

An objective of the present invention is to provide users with an air driven electrical power generating system, to help produce on demand renewable energy. The present invention intends to provide reliable electricity without releasing greenhouse gases.

SUMMARY OF THE INVENTION

The present invention discloses an electrical power generating system that comprises one or more air compressors, one or more air staging tanks, one or more turbines, and one or more electric generators. The one or more air compressors are in fluid communication with the one or more air staging tanks to supply compressed air to the one or more air staging tanks. The one or more air staging tanks are connected to and in fluid communication with the one or more turbines to convey the compressed air to the one or more turbines, wherein the one or more turbines are rotated by the compressed air. Each of the one or more turbines is connected to an electric generator from the one or more electric generators to generate power from the compressed air flowing through the one or more turbines. The one or more turbines are arranged one above another to form a vertical air pathway through the one or more turbines.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of electrical power generating system, embodiments of the present disclosure are not limited to use only in this context.

The present invention is an electrical power generating system that is designed to produce renewable energy. It is an aim of the present invention to provide users with a reliable on demand electricity source that does not release greenhouse gases. It is another aim of the present invention to provide an electrical power generating system that can be scaled in size to accommodate residential or commercial needs. It is yet another aim of the present invention to provide a constant renewable energy source, regardless of wind or solar conditions.

Figure 1:
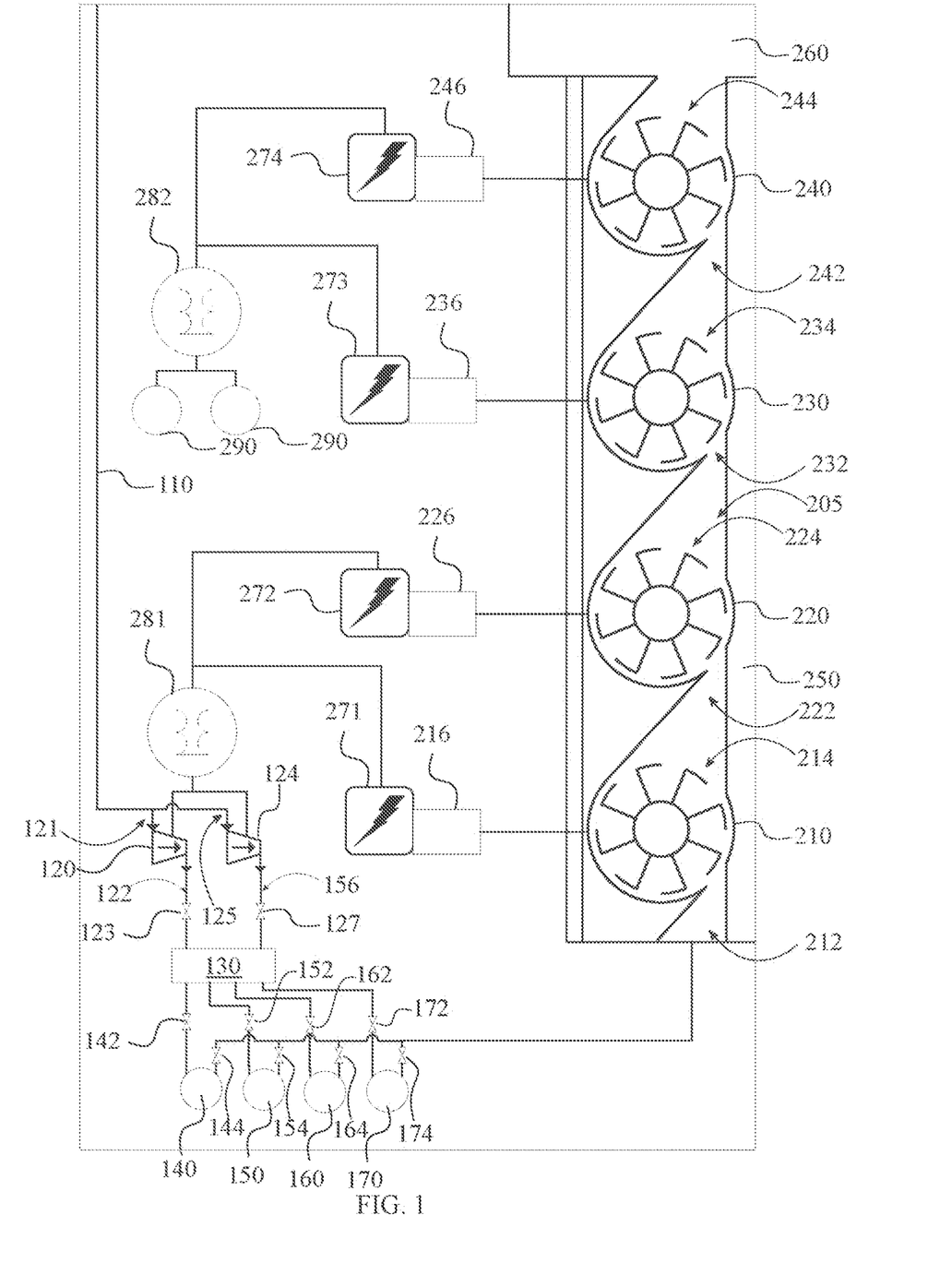
FIG. 1 depicts a schematic illustration of the present invention.

Referring now to the figures of the present disclosure. FIG. 1 is a schematic illustration depicting the components of the present invention. The electrical power generating system of the present invention comprises one or more air compressors, one or more air staging tanks, one or more turbines, and one or more electric generators.

In reference to FIG. 1, the one or more air compressors are designed to produce pressurized air flow in order to drive the one or more turbines. It should be noted that the air compressors can be of any shape, size, material, features, type or kind, orientation, location, quantity, components, and arrangements of components that would allow the present invention to fulfill the objectives and intents of the present invention. In one embodiment, the one or more air compressors are in fluid communication with the one or more air staging tanks to supply compressed air to the one or more air staging tanks. Each air compressor may comprise an upstream end and a downstream end. Preferably, the electrical power generating system of the present invention further comprises a compressed air storage tank 130 designed to store the compressed air produced by the air compressor. In a preferred embodiment, the compressed air storage tank 130 is connected between the downstream ends of the air compressors and the one or more air staging tanks such that the compressed air is stored in the compressed air storage tank before entering the air staging tanks. In one embodiment, the electrical power generating system of the present invention may further comprise a main air intake line 110. The main air intake line 110 connected to the upstream ends of the one or more air compressors and in fluid communication with the one or more air compressors. In this way, air can be supplied from the atmosphere to the air compressors. Preferably, the downstream end of each of the one or more air compressors further comprises a main inlet valve located between the respective air compressor and the compressed air storage tank 130.

In the illustrated embodiment, the electrical power generating system of the present invention comprises a first air compressor 120 and a second air compressor 124. The first air compressor 120 comprises an upstream end 121 and a downstream end 122. The second air compressor 124 comprises an upstream end 125 and a downstream end 126. The compressed air storage tank 130 being connected between the downstream ends 122, 126 of the first air compressor 120 and the second air compressor 126 and the one or more air staging tanks. Further, the downstream end 122 of the first air compressor 120 comprises a first main inlet valve 123 located between the first air compressor 120 and the compressed air storage tank 130, while the downstream end 126 of the second air compressor 124 comprises a second main inlet valve 127 located between the second air compressor 124 and the compressed air storage tank 130. It should be noted that a different number of air compressors is also contemplated and within the scope of the present invention.

The one or more air staging tanks are configured to convey compressed air from the air compressors or the compressed air storage tank 130 to the turbines. It should be noted that the air staging tanks can be of any shape, size, material, features, type or kind, orientation, location, quantity, components, and arrangements of components that would allow the present invention to fulfill the objectives and intents of the present invention. In one embodiment, the one or more air staging tanks are connected to and in fluid communication with the one or more turbines such that the turbines can be rotated by the compressed air. In a preferred embodiment, each of the air staging tanks may deliver the compressed air at a pressure up to 150 psi. In a preferred embodiment, each of the one or more air staging tanks comprises an air staging inlet valve and an air staging outlet valve. The air staging inlet valve of each of the one or more air staging tanks is connected between the compressed air storage tank 130 and the respective air staging tank, while the air staging outlet valve of each of the one or more air staging tanks is connected between the respective air staging tank and the one or more turbines. Preferably, the one or more air compressors, the compressed air storage tank 130, and the one or more air staging tanks are located at the bottom part of the system.

In the illustrated embodiment, the one or more air staging tanks comprise a first air staging tank 140, a second air staging tank 150, a third air staging tank 160, and a fourth air staging tank 170. The first air staging tank 140 comprises a first air staging inlet valve 142 and a first air staging outlet valve 144. The second air staging tank 150 comprises a second air staging inlet valve 152 and a second air staging outlet valve 154. The third air staging tank 160 comprises a third air staging inlet valve 162 and a third air staging outlet valve 164. The fourth air staging tank 170 comprises a fourth air staging inlet valve 172 and a fourth air staging outlet valve 174. In this embodiment, the four air staging tanks may produce compressed air at a pressure up to 600 psi.

Figure 2:
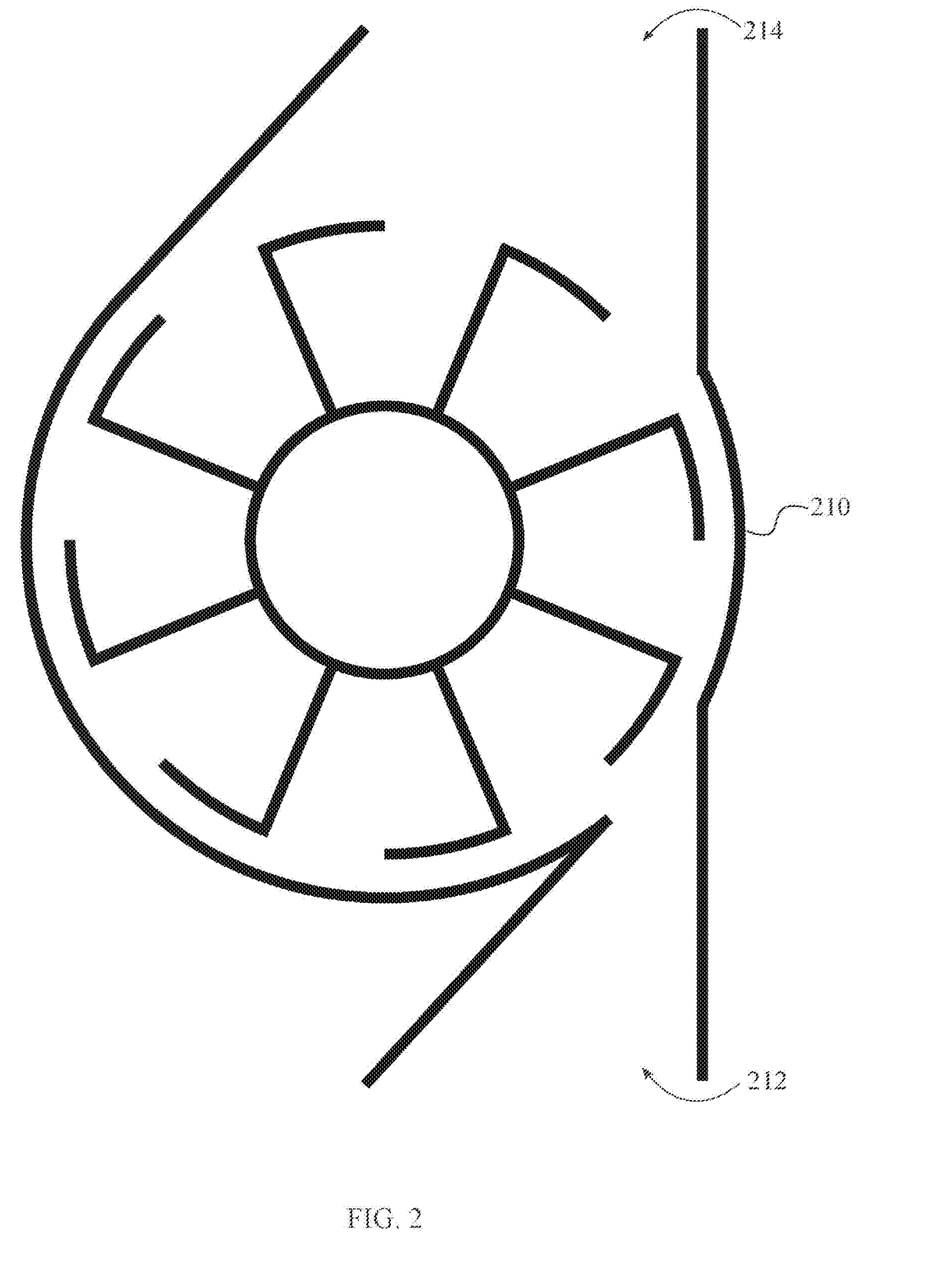
FIG. 2 depicts a schematic illustration of a turbine of the present invention.

The one or more turbines are configured to be driven by the compressed air and connected to the electric generators. It should be noted that the turbines can be of any shape, size, material, features, type or kind, orientation, location, quantity, components, and arrangements of components that would allow the present invention to fulfill the objectives and intents of the present invention. Each of the one or more turbines is connected to an electric generator from the one or more electric generators to generate power from the compressed air flowing through the one or more turbines. In one embodiment of the present invention, the one or more turbines are arranged one above another to form a vertical air pathway 205 through the one or more turbines. In other words, the turbines are stacked vertically such that a series of turbines can utilize the same compressed air moving upwards. In a preferred embodiment, each of the one or more turbines is connected to an electric generator from the one or more electric generators via a gearbox. Each of the one or more turbines comprises an air intake end and an air exhaust end, and the air intake end of each of the one or more turbines is connected to the air exhaust end of the previous turbine. Moreover, each of the one or more turbines is oriented such that the air intake end is at the bottom of the turbine and the air exhaust end is at the top of the turbine. In a preferred embodiment, the air intake end and the air exhaust end of each of the one or more turbines are tapered. Moreover, in one embodiment, the ratio of the turbines to the air staging tanks may be 1:1. This ratio makes sure that the compressed air has sufficient pressure to drive the turbines.

In the illustrated embodiment, the one or more turbines comprise a first turbine 210, a second turbine 220, a third turbine 230, and a fourth turbine 240. The first turbine 210 comprises a first air intake end 212 and a first air exhaust end 214. In this embodiment, the first turbine 210 is the lowest turbine in the stack of turbines, and the first air intake end 212 is connected to and in fluid communication with the air staging tanks. The second turbine 220 comprises a second air intake end 222 and a second air exhaust end 224. The third turbine 230 comprises a third air intake end 232 and a third air exhaust end 234. The fourth turbine 240 comprises a fourth air intake end 242 and a fourth air exhaust end 244. The second air intake end 222 is attached to the first air exhaust end 214. The third air intake end 232 is attached to the second air exhaust end 224. The fourth air intake end 222 is attached to the third air exhaust end 234. In one embodiment, the electrical power generating system of the present invention further comprises a support structure 250 configured to hold the turbines in position.

In a preferred embodiment, the electrical power generating system of the present invention further comprises a water reservoir 260 that is located at the top of the one or more turbines and is in fluid communication with the air exhaust end of an uppermost turbine. For example, in the embodiment illustrated in FIG. 1, the water reservoir 260 is located above the fourth turbine 240 and is in fluid communication with the fourth air exhaust end 244. In this way, the turbines are filled with water. When the compressed air is delivered to the turbines, it is then trapped within the turbines, displacing the water and making the bottom side of the turbine lighter. This design allows for gravity to control the rotation of the turbine as the air within each turbine compartment attempts to move towards the water surface, rotating the turbines.

In one embodiment, the one or more electric generators comprise a first electric generator 271, a second electric generator 272, a third electric generator 273, and a fourth electric generator 274. The first electric generator 271 is connected to and associated with the first turbine 210, preferably via a first gearbox 216. The second electric generator 272 is connected to and associated with the second turbine 220, preferably via a second gearbox 226. The third electric generator 273 is connected to and associated with the third turbine 230, preferably via a third gearbox 236. The fourth electric generator 274 is connected to and associated with the fourth turbine, preferably via a fourth gearbox 246.

In one embodiment, the electrical power generating system of the present invention further comprises one or more voltage regulators. The one or more voltage regulators are electrically connected to the one or more electric generators. The voltage regulators are designed to provide electrical power with a constant voltage. In a preferred embodiment, a portion of the produced electrical power may be supplied to the air compressors.

In the illustrated embodiment, the electrical power generating system of the present invention further comprises a first voltage regulator 281 and a second voltage regulator 282. The first voltage regulator 281 is electrically connected to the first electric generator 271 and the second electric generator 272, while the second voltage regulator 282 is electrically connected to the third electric generator 273 and the fourth electric generator 274. Moreover, an output of the first voltage regulator 271 is electrically connected to the one or more air compressors to supply power to the one or more air compressors. In another embodiment, an output of the second voltage regulator 282 is electrically connected to external devices 290 to supply power thereto.

It is envisioned that the number of the components forming the present invention such as the air compressors, the air staging tanks, the turbines, and/or voltage regulators can vary based on design requirements.

Figure 3:
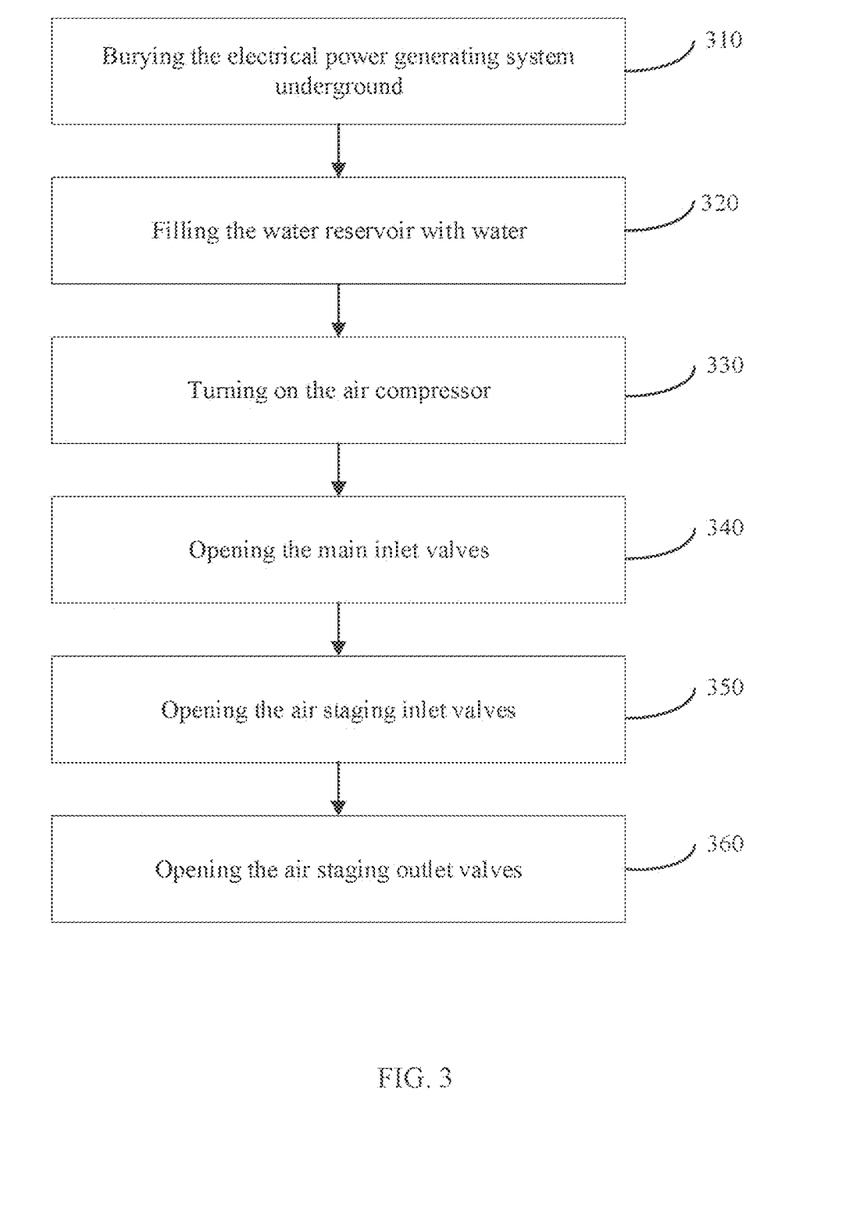
FIG. 3 depicts a flowchart of the method of using the electrical power generating system of the present invention.

In a further aspect of the present invention, a method of using the electrical power generating system of the present invention is disclosed. As shown in FIG. 3, at step 310, the electrical power generating system is buried underground. This step is preferred because it is easier to obtain the necessary construction permits and it can also reduce damage from external environmental factors such as weather. It should be noted that the system of the present invention can also be placed above ground or any other suitable locations. The water reservoir is then filled with water at step 320, such that the turbines are also filled with water. The air compressors are turned on at step 330. Then the main inlet valves are opened at step 340 such that the compressed air can be conveyed to and stored in the compressed air storage tank. Then the air staging inlet valves are opened at step 350, allowing the compressed air to enter the air staging tanks. The air staging outlet valves are then opened at step 360, allowing the compressed air to be delivered to the turbines.

Figure 4:
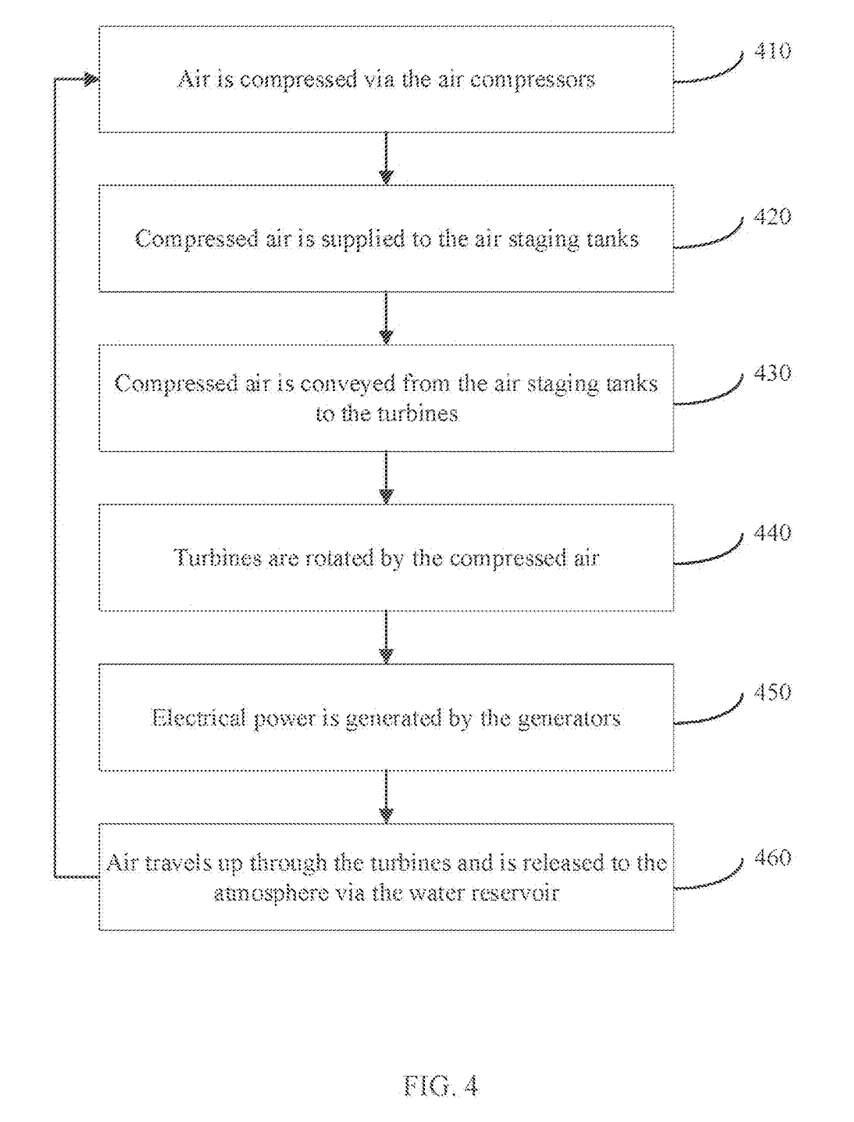
FIG. 4 depicts the workflow of the electrical power generating system of the present invention.

FIG. 4 depicts the workflow of the electrical power generating system of the present invention. At step 410, the air is compressed via the air compressors. At step 420, the compressed air is then supplied to the air staging tanks, preferably via the compressed air storage tank. The compressed air is then conveyed from the air staging tanks to the turbines at step 430, such that the turbines are rotated by the compressed air at step 440. Then electrical power is generated by the electric generators at step 450. Further, the air travels up through the turbines and is released to the atmosphere via the water reservoir at step 460.

Although the disclosure has been explained in relation to its preferred embodiment, it is to be understood that many other possible modifications and variations can be made without departing from the spirit and scope of the disclosure.

What is claimed is:

1. An electrical power generating system, comprising:
   one or more air compressors, the one or more air compressors comprising a first air compressor and a second air compressor, each of the first air compressor and the second air compressor comprising an upstream end and a downstream end;
   one or more air staging tanks;
   one or more turbines;
   one or more electric generators;
   a compressed air storage tank;
   the one or more air compressors being in fluid communication with the one or more air staging tanks to supply compressed air to the one or more air staging tanks;
   the one or more air staging tanks being connected to and in fluid communication with the one or more turbines to convey the compressed air to the one or more turbines, wherein the one or more turbines are rotated by the compressed air;
   each of the one or more turbines being connected to an electric generator from the one or more electric generators to generate power from the compressed air flowing through the one or more turbines;
   the one or more turbines being arranged one above another to form a vertical air pathway through the one or more turbines;
   the compressed air storage tank being connected between the downstream ends of the first air compressor and the second air compressor and the one or more air staging tanks;
   the downstream end of the first air compressor comprising a first main inlet valve located between the first air compressor and the compressed air storage tank;
   the downstream end of the second air compressor comprising a second main inlet valve located between the second air compressor and the compressed air storage tank.

2. The electrical power generating system as claimed in claim 1, wherein each of the one or more turbines is connected to an electric generator from the one or more electric generators via a gearbox.

3. The electrical power generating system as claimed in claim 1, wherein each of the one or more turbines comprises an air intake end and an air exhaust end.

4. The electrical power generating system as claimed in claim 3, wherein the air intake end of each of the one or more turbines is connected to the air exhaust end of the previous turbine.

5. The electrical power generating system as claimed in claim 3, wherein each of the one or more turbines is oriented such that the air intake end is at the bottom of the turbine and the air exhaust end is at the top of the turbine.

6. The electrical power generating system as claimed in claim 3, wherein the air intake end and the air exhaust end of each of the one or more turbines are tapered.

7. The electrical power generating system as claimed in claim 3, further comprising:
   a water reservoir filled with water;
   the water reservoir being located at the top of the one or more turbines and being in fluid communication with the air exhaust end of an uppermost turbine.

8. The electrical power generating system as claimed in claim 1, wherein the one or more turbines comprise a first turbine, a second turbine, a third turbine, and a fourth turbine.

9. The electrical power generating system as claimed in claim 8, wherein the one or more electric generators comprise a first electric generator, a second electric generator, a third electric generator, and a fourth electric generator, the first electric generator being connected to and associated with the first turbine, the second electric generator being connected to and associated with the second turbine, the third electric generator being connected to and associated with the third turbine, and the fourth electric generator being connected to and associated with the fourth turbine.

10. The electrical power generating system as claimed in claim 9, further comprising:
    a first voltage regulator;
    a second voltage regulator;
    the first voltage regulator being electrically connected to the first electric generator and the second electric generator; and
    the second voltage regulator being electrically connected to the third electric generator and the fourth electric generator.

11. The electrical power generating system as claimed in claim 1, further comprising:
    one or more voltage regulators;
    the one or more voltage regulators being electrically connected to the one or more electric generators.

12. The electrical power generating system as claimed in claim 10, wherein an output of the first voltage regulator being electrically connected to the one or more air compressors to supply power to the one or more air compressors.

13. The electrical power generating system as claimed in claim 1, wherein the ratio of the turbines to the air staging tanks is 1:1.

14. An electrical power generating system, comprising:
    one or more air staging tanks, each of the one or more air staging tanks comprises an air staging inlet valve and an air staging outlet valve;
    one or more turbines;
    one or more electric generators;
    a compressed air storage tank;
    one or more air compressors, each of the one or more air compressors comprising an upstream end and a downstream end;
    the compressed air storage tank being connected between the downstream ends of the one or more air compressors and the air staging inlet valve of each of the one or more air staging tanks;
    the one or more air compressors being in fluid communication with the one or more air staging tanks to supply compressed air to the one or more air staging tanks;
    each of the one or more air staging tanks, via the air staging outlet, being connected to and in fluid communication with the one or more turbines to convey the compressed air to the one or more turbines, wherein the one or more turbines are rotated by the compressed air;

each of the one or more turbines being connected to an electric generator from the one or more electric generators to generate power from the compressed air flowing through the one or more turbines;

the one or more turbines being arranged one above another to form a vertical air pathway through the one or more turbines.

15. The electrical power generating system as claimed in claim 14, further comprising:

a main air intake line;

the main air intake line being connected to the upstream ends of the one or more air compressors and in fluid communication with the one or more air compressors.

16. The electrical power generating system as claimed in claim 14, wherein the downstream end of each of the one or more air compressors further comprises a main inlet valve located between the respective air compressor and the compressed air storage tank.

17. The electrical power generating system as claimed in claim 14, wherein the one or more air staging tanks comprise a first air staging tank, a second air staging tank, a third air staging tank, and a fourth air staging tank.

* * * * *